(12) United States Patent
MacIntosh, Jr.

(10) Patent No.: US 6,502,940 B1
(45) Date of Patent: Jan. 7, 2003

(54) CONNECTION MOUNTING FOR RIMLESS EYEWEAR LENSES

(75) Inventor: Charles M. MacIntosh, Jr., Middleboro, MA (US)

(73) Assignee: The Hilsinger Company L.P., Plainville, MA (US)

( * ) Notice: Subject to any disclaimer, the term of this patent is extended or adjusted under 35 U.S.C. 154(b) by 0 days.

(21) Appl. No.: 10/013,899

(22) Filed: Dec. 11, 2001

(51) Int. Cl.⁷ .................................................. G02C 1/02
(52) U.S. Cl. ........................ 351/110; 351/124; 351/141
(58) Field of Search ........................... 351/110, 41, 111, 351/140, 133, 124, 141

(56) References Cited

U.S. PATENT DOCUMENTS

| | | |
|---|---|---|
| 2,004,005 A | 6/1935 | McDanal |
| 2,048,298 A | 7/1936 | Searles |
| 2,181,365 A | 11/1939 | Cozzens |
| 2,256,846 A | 9/1941 | Lohmann |
| 2,332,160 A | 10/1943 | McDonell |
| 2,828,668 A | 4/1958 | Angelis |
| 4,776,685 A | 10/1988 | Jeunet ......................... 351/90 |
| 5,659,380 A | 8/1997 | Kobayashi ................. 351/110 |
| 5,988,810 A | 11/1999 | Geyer ........................ 351/110 |
| 6,024,445 A | 2/2000 | Conner et al. ............. 351/110 |
| 6,170,950 B1 | 1/2001 | Yoshida ....................... 351/110 |
| 6,199,981 B1 | 3/2001 | Chao .......................... 351/110 |

Primary Examiner—Hung Xuan Dang
(74) Attorney, Agent, or Firm—Barlow, Josephs & Holmes, Ltd.

(57) ABSTRACT

A connection mounting for rimless eyewear for connecting a joint section to a corresponding lens having a circular hardware receiving aperture with an inner wall includes a connection member, having a free end, and a bushing integrally connected to and emanating from the connection member proximal to the free end thereof. The bushing includes an inner threaded bore and an outer surface and a free end. A number of cutting edges are integrally connected to and emanate from the outer surface of the bushing. A threaded fastener, having a threaded shank and a head, is routed through the circular hardware receiving aperture with the threaded shank in threaded communication with the inner threaded bore of the bushing with the number of cutting edges being embedded in the inner wall of the circular hardware receiving aperture of the corresponding lens. As the fastener is threaded into the threaded bore of the bushing, the bushing is drawn into the circular hardware receiving aperture to cause the cutting members to dig into the periphery of the receiving aperture and thereby prevent rotation of the bushing and the connection member connected thereto.

45 Claims, 7 Drawing Sheets

CONNECTION MOUNTING FOR RIMLESS EYEWEAR LENSES

BACKGROUND OF THE INVENTION

The present invention relates generally to rimless eyewear and rimless clip-on eyewear. More specifically, the present invention relates to connection mountings for rimless eyewear and rimless clip-on eyewear.

Typical eyewear construction includes a pair of lenses and a metal or plastic frame that embraces the lenses. Incorporated into the frame are mounts for eyewear hardware which includes temples and bridge. Since these mounts are incorporated into the frame, they can securely receive corresponding bridges and temples. Nose pads are commonly incorporated into the bridge construction. The bridge hardware connects the frames about the two lenses together at the desired distance. Temples are connection to the opposing ends of the frames which are not connected to the bridge hardware. The temples are typically hingedly connected to the eyewear frames.

In the prior art, rimless eyewear is also well known. Such rimless eyewear has become increasingly popular for its fashion and light weight. In prior art rimless eyewear, the mounting hardware, i.e. the temples and bridge, are connected directly to the lens itself not to a frame about the lens. Since the hardware is connected directly to the lens itself, there is a concern in the prior art with the ability to firmly secure the hardware to the delicate lens. Also, unlike lenses with frames, alignment of hardware onto the rimless lens is difficult to maintain.

In view of the aforementioned problems associated with known rimless eyewear construction, many attempts have been made in the prior art to solve these problems. A single hole for each hardware connection may be provided, however, the fastener connecting the hardware to the lens must be extremely tight which will have the likelihood of loosening over time which will cause the hardware to come out of alignment. To address the alignment problem, in the prior art, each lens is provided with a pair of round drilled holes for receipt of a corresponding pair of threaded posts connected to the free end of the mounting hardware, such as a bridge or a temple. Combination notching and stabilizer bar assemblies are typically required in the prior art. The threaded posts are secured to the lens by the appropriate nuts. The dual point connection maintains the alignment of the hardware and prevents unwanted rotation thereof. This prior art construction requires the drilling of a pair of holes and notching for each connection to the lens thus requiring a corresponding large profile connection mounting. As a result, dual connection point rimless connections are very undesirable.

There have also been attempts to mount hardware to a single connection point through a single hole through the lens. These prior art attempts employ a single non-round hole for receiving a complimentary non-round connection member. For example, a square hole has been provided through the lens for receiving a post of the mounting hardware that is square in cross-section. When the square post resides in the square aperture in the lens, the post is prevented from rotating, thus the alignment of the connection member connected to the post is maintained. However, this prior art construction requires the creation of a non-round hole through the lens. This operation will require equipment in addition to the optician's standard round drill bit. Such a non-round hole would have to be formed using a specialized drill bit or punch tool.

Therefore, in view of the concerns discussed above, it would be desirable for a connection mounting for a rimless eyewear lens be able to maintain the alignment of the hardware attached thereto. It is also desirable for such a connection mounting to employ only a single hole through the lens for each hardware mounting. Further, it is also desirable for the single hole through the lens to be round to enable the formation thereof by standard drilling equipment. There is also a desire for the connection mounting to be easy to install and have an attractive low profile with as few parts as possible.

SUMMARY OF THE INVENTION

The present invention preserves the advantages of connection mountings for rimless eyewear lenses. In addition, this connection mounting provides new advantages not found in prior art eyewear connection mountings, and overcomes many of the disadvantages of such connection mountings.

The invention is generally directed to a novel and unique connection mounting for eyewear lenses with particular application in rimless eyewear systems. The connection mounting of the present invention enables a rimless connection to an eyewear lens using a single round hole. The present invention enables the convenient and quick assembly of rimless eyewear without the need for complex mounting hardware and unnecessary holes.

The preferred embodiment of the connection mounting of the present invention includes a corresponding lens having a circular hardware receiving aperture with an inner wall that includes a connection member with a free end and a bushing integrally connected to and emanating from the connection member proximal to the free end thereof. The bushing includes an inner threaded bore and an outer surface and a free end. A number of cutting edges are integrally connected to and emanate from the outer surface of the bushing. A threaded fastener, having a threaded shank and a head, is routed through the circular hardware receiving aperture with the threaded shank in threaded communication with the inner threaded bore of the bushing with the number of cutting edges being embedded in the inner wall of the circular hardware receiving aperture of the corresponding lens. As the fastener is threaded into the threaded bore of the bushing, the bushing is drawn into the circular hardware receiving aperture to cause the cutting members to dig into the periphery of the receiving aperture and thereby prevent rotation of the bushing and the connection member connected thereto. The bushing may be made of either plastic or metal material.

For the installation of the connection mounting of the present invention, a single round hole is drilled at opposing ends of each of the two eyewear lenses for a total of four holes. One hole of each lens corresponds to a temple connection member while the other hole of each lens corresponds to a bridge connection member. For each connection point, a threaded fastener is routed through the round hole into threaded engagement with the threaded bore of the bushing. Further threaded installation of the threaded fastener draws the bushing, and its cutting edges, into engagement with the round drilled hole. Such engagement with the round drilled hole causes the cutting edges to dig into the lens thus preventing the bushing and the connection member connected thereto from rotating within the round drilled hole. In accordance with the present invention, a connection member is securely fixed to a corresponding lens using only a single round drilled hole which provides an easy to install, low profile connection mounting for rimless eyewear lenses.

It is therefore an object of the present invention to provide a connection mounting for a rimless eyewear system.

An additional object of the present invention is to provide a connection mounting for a rimless eyewear system that requires only a single hole for each bridge or temple mounting.

Another object of the present invention is to provide a connection mounting for a rimless eyewear system that requires the drilling of standard round holes.

It is another object of the present invention to provide a connection mounting for a rimless eyewear system that is easy and quick to assemble and install.

It is a further object of the present invention to provide a connection mounting for a rimless eyewear system that is low in profile.

It is yet a further object of the present invention to provide a connection mounting for a rimless eyewear system that is stable and free of wobbling.

It is another object of the present invention to provide a connection mounting for a rimless eyewear system that maintains exact alignment of lens mounting.

It is a further object of the present invention to provide a connection mounting for a rimless eyewear system that has a construction with as few component parts as possible.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
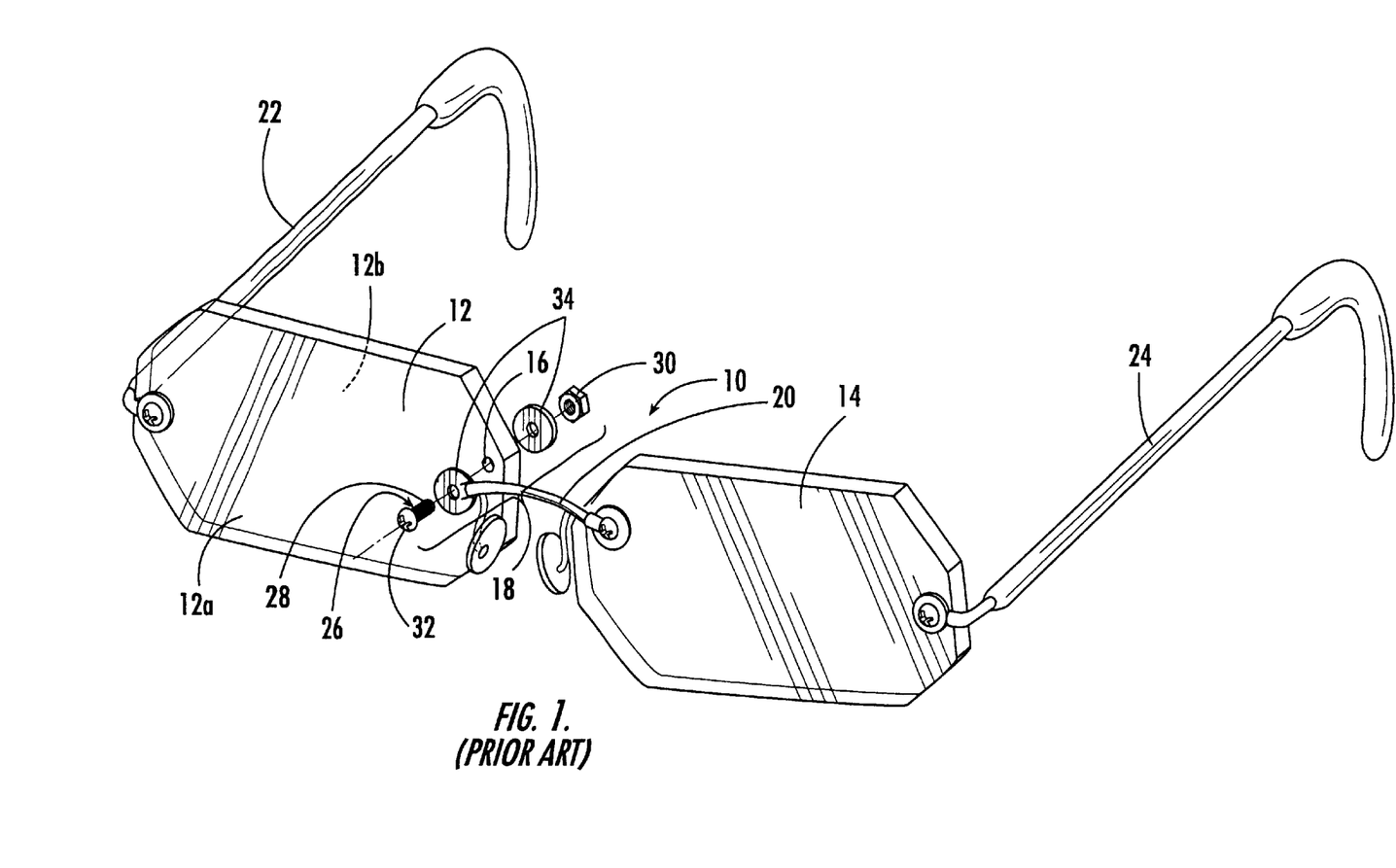
FIG. 1 is a perspective view of a prior art connection mounting for rimless eyewear lenses.

Referring first to FIG. 1, a perspective view of a prior art rimless eyewear system 10 shown. In this prior art construction 10 pair of lenses 12, 14 are provided with a connection aperture 16 for each hardware mounting 18. Each lens 12, 14 is connected to a bridge 20 as well as to a temple 22, 24. Specifically, the left lens 12 is connected on its left side to a left temple 22 and to the bridge 20 on its right side. The right lens 14 is connected on its right side to a right temple 24 and to the bridge 20 of its left side. Each of the prior art connections 18 include an aperture 16 through the lens 12, 14 itself to receive a threaded fastener 26 therethrough. The threaded shank 28 of the fastener is routed through the aperture 16 and into threaded engagement with a nut 30 on the rear side 12*b* of the lens 12. The head 32 of the fastener 26 resides on the front side 12*a* of the lens 12. Gaskets 34 are preferably provided to prevent damage to the lens 12 from the threaded fastener 26 and nut 30. Ideally, the fastener 26 and nut 30 are tightened sufficiently so that the bridge 20 and temples 22, 24 do not rotate relative the lenses 12, 14 so that proper alignment is maintained. However, over a short period of time and from normal handling, the fasteners 26 at each connection point will become loose thus permitting the lenses 12, 14 to rotate relative to the hardware 22, 20 and 24 and, as a result, undesirably come out of alignment.

Figure 2:
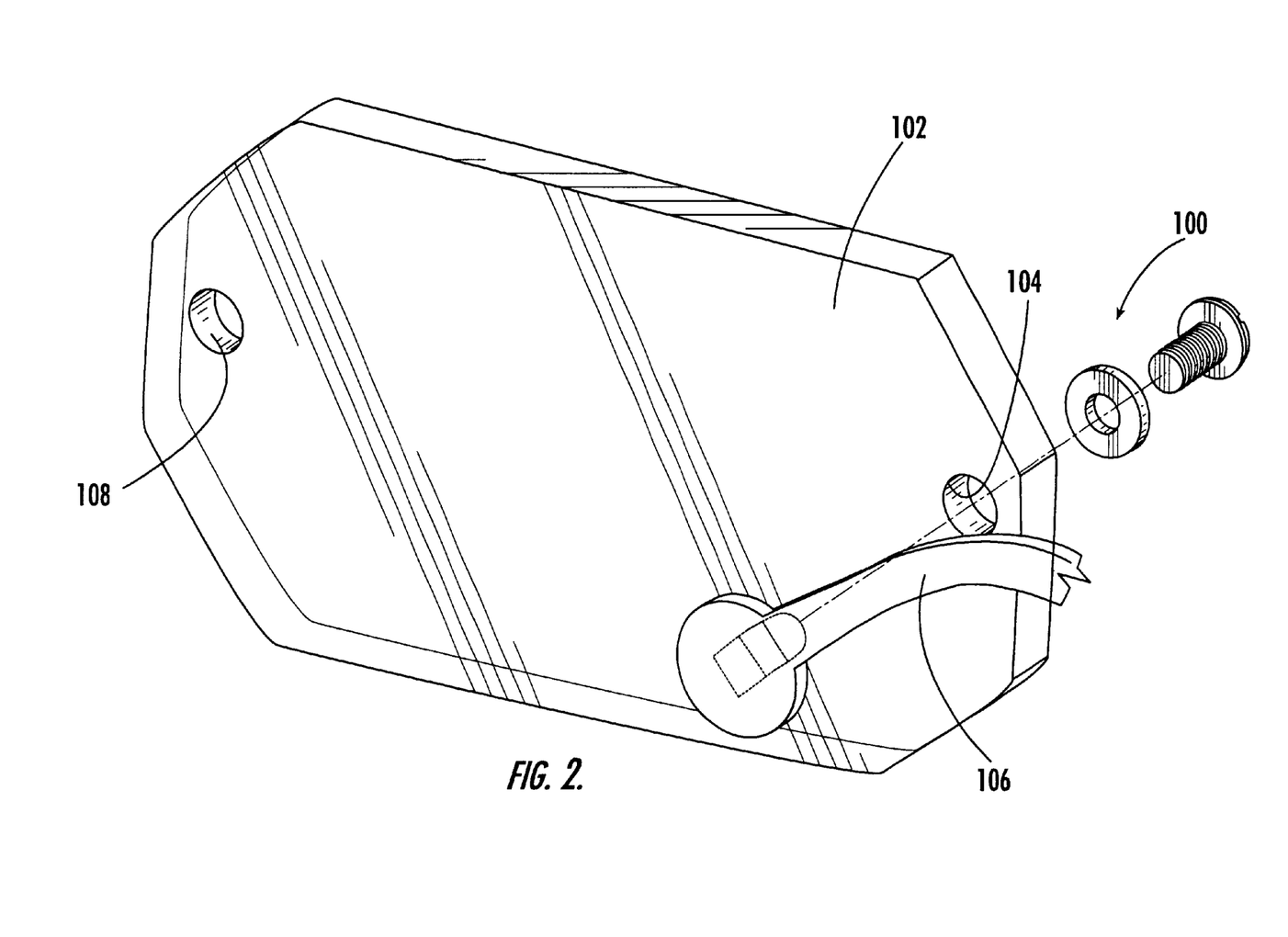
FIG. 2 is an exploded perspective view of the preferred embodiment of the connection mounting for rimless eyewear lenses in accordance with the present invention.

As shown in FIGS. 2–5, the preferred embodiment 100 of the connection mounting of the present invention addresses the problems associated with the prior art connection mountings. In FIG. 2, an exploded perspective view of the connection mounting 100 for rimless eyewear lenses is shown to include a lens 102, made of polycarbonate, plastic or the like, with a single round connection mounting hole 104 for each hardware component and its connection. Such a round hole 104 is easily drilled using common and standard drill bits and equipment. For illustration purposes, connection of a temple hardware component, generally shown as 106, will be shown and discussed in detail below to the aperture on the right side of the lens 102. It should be understood that the left hole 108 is provided on the opposing side of the lens 102 for receipt of bridge hardware, and the like (not shown). The interconnection of the bridge hardware to the lens 102 itself and the connection hardware to the other lens is the same as the temple hardware so its need not be discussed in detail.

Figure 3:
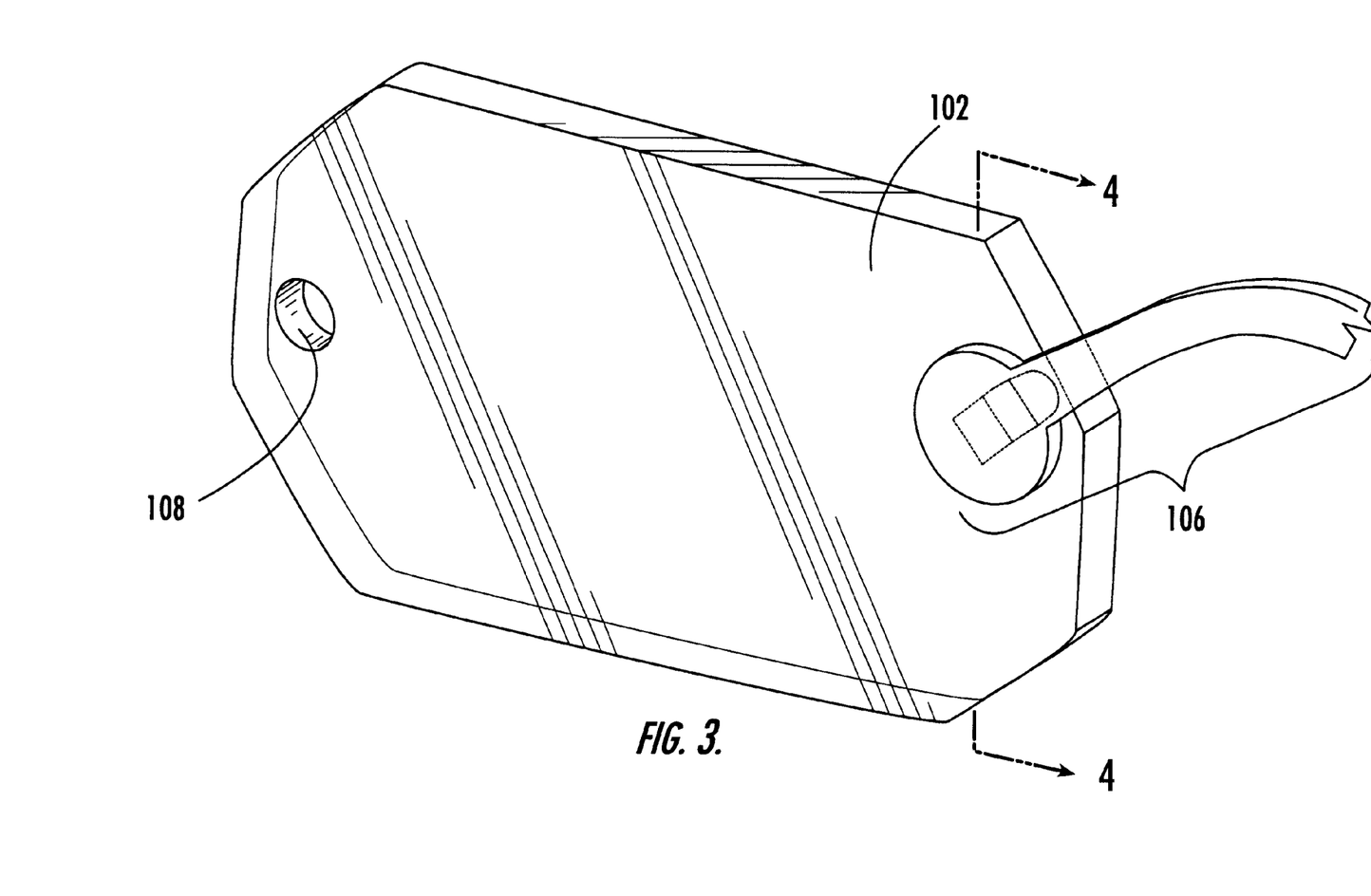
FIG. 3 is perspective view of the connection mounting for rimless eyewear lenses of FIG. 2 in a fully installed condition.
Figure 4:
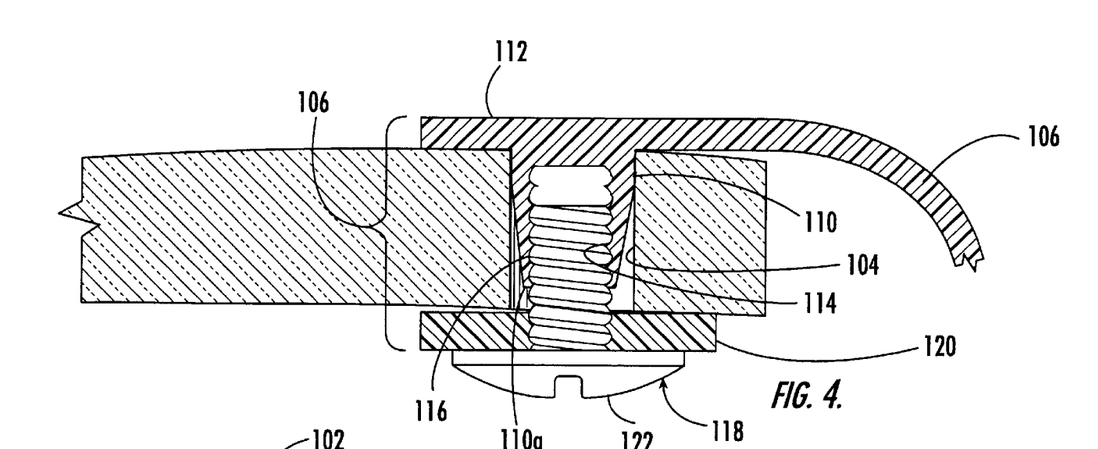
FIG. 4 is a cross-sectional view through the line 4—4 of FIG. 3.
Figure 5:
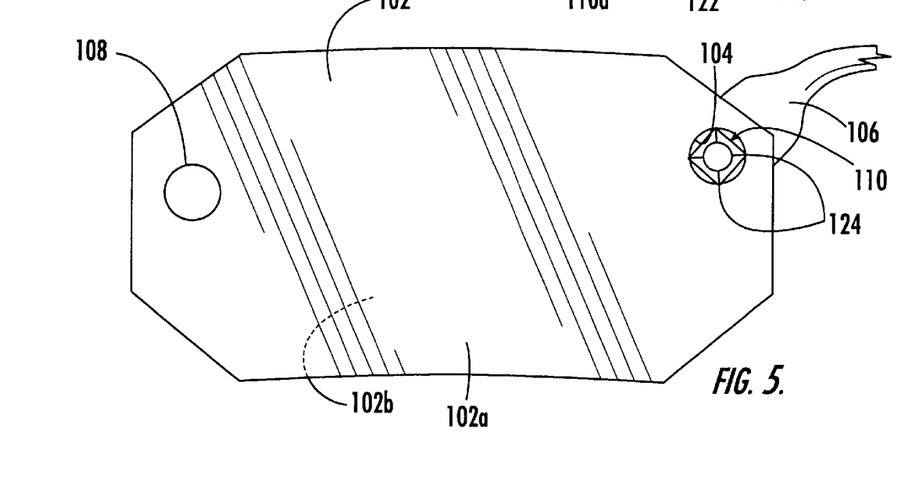
FIG. 5 is a rear elevational view of the connection mounting of FIG. 3 with faster and washer removed for clarity.

The hardware component 106, as shown in the temple in FIGS. 2–4, has a bushing 110 integrally connected thereto preferably proximal to its free end 112. The bushing 110 emanates away from the hardware component 106 toward the lens 102. The bushing 110 includes an inner threaded bore 114 for receipt of a threaded shank 116 of a fastener 118. A gasket or washer 120, such as made of felt or rubber material, is optionally included between the head 122 of the fastener 118 and the rear 102*b* of the lens 102 to assist in protecting the lens 102. In the preferred embodiment of the present invention, the bushing 110 has a non-round cross-section which includes a array of cutting edges 124 about the periphery thereof. In the embodiment of FIGS. 2–5, the bushing 110 has a square cross-section with a threaded inner bore 114. The distance from one cutting edge 124 of the bushing to a cutting edge 124 across from it is slightly greater than the diameter of the receiving aperture 126 in the lens 102. As best seen in FIG. 4, the bushing 110 is preferably inwardly tapered running from the top of the bushing 110 down to its free end 110*a*.

For installation, the threaded faster 118 is routed into the receiving aperture 126 from the rear side 102*b* of the lens 102. The integrally connected bushing 110 is routed into the receiving aperture 126 from the front side 102*a* of lens 102. The inward taper at the free end 110*a* of the bushing 110 facilitates the insertion of the bushing 110 in the aperture 126 so the threaded shank 116 of the threaded fastener 118 threadably engages with the threaded bore 114 in the center of the bushing 110. The bushing 110, and the mounting hardware 106 connected thereto, is aligned as desired relative to the lens 102. Via the head 122, the threaded fastener 118 is further threaded into the threaded bore 114 of the bushing 110 with the assistance of a screwdriver (not shown), or the like. As the threaded fastener 118 is installed into the threaded bore 114 of the bushing 110, the bushing 110 is drawn further into the receiving aperture 126. While the bushing 110 is being drawn into the receiving aperture 126, the cutting edges 124 of bushing 110 eventually contact the outer periphery of the receiving aperture 126 in the lens 102. Even further drawing of the bushing 110 into the aperture 126 causes the cutting edges 124 to embed into the lens 102, which is preferably made of polycarbonate, about the periphery of the aperture 126. The polycarbonate material, which is frequently used for rimless eyewear, is soft and resilient enough to receive the cutting edges 124 of the bushing 110 without cracking. As shown in detail in FIG. 5, the cutting edges 124 are embedded in the lens 102 and thereby prevent rotation of the bushing 110 therein. As a result, the hardware 106 connected to the bushing 110, such as a temple, remains desirably aligned on the lens 102.

Figure 6:
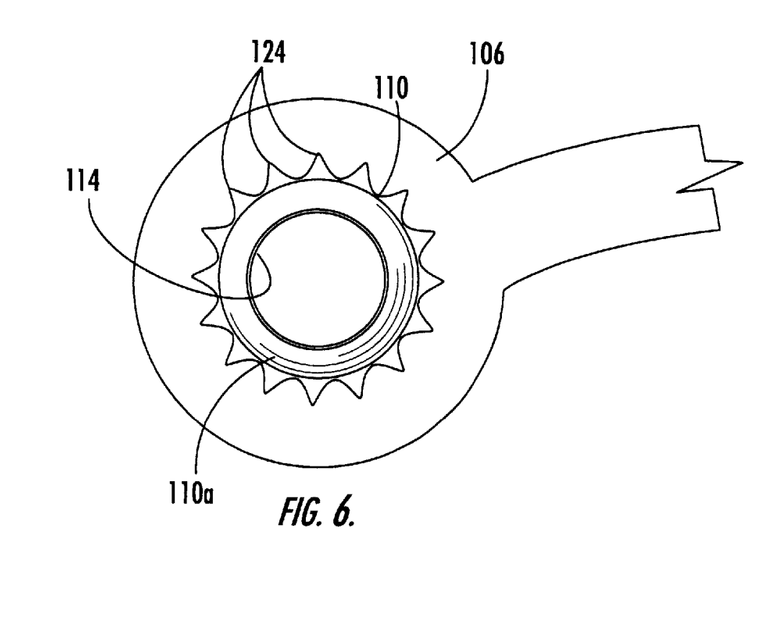
FIG. 6 is a bottom view of an alternative bushing used in accordance with the present invention.
Figure 7:
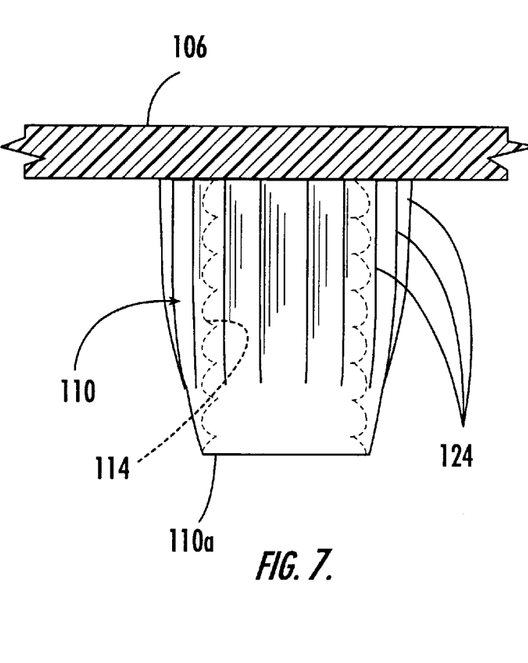
FIG. 7 is a side elevational view of the bushing of FIG. 7.

A bushing 110 with a square cross-section and a total of four cutting edges 124 is one of many different configuration of bushings 110 that can be employed in accordance with the present invention. The bushing 110 may be provided with any number of cutting edges 124 for embedding about the aperture 126 of a polycarbonate or other malleable material lens to maintain the alignment of eyewear mounting hardware 106. For example, the bushing 110 may have a hexagonal cross-section with six cutting edges 124 or an octagonal cross-section with eight cutting edges 124. Also, as shown in FIGS. 6 and 7, the bushing 110 may have a star-shaped cross-section with a total of sixteen cutting edges 124. The configuration of the bushing 110 and the number of cutting edges 124 may be selected on the type of eyewear mounting 106 and the material employed for the lens 102.

Figure 8:
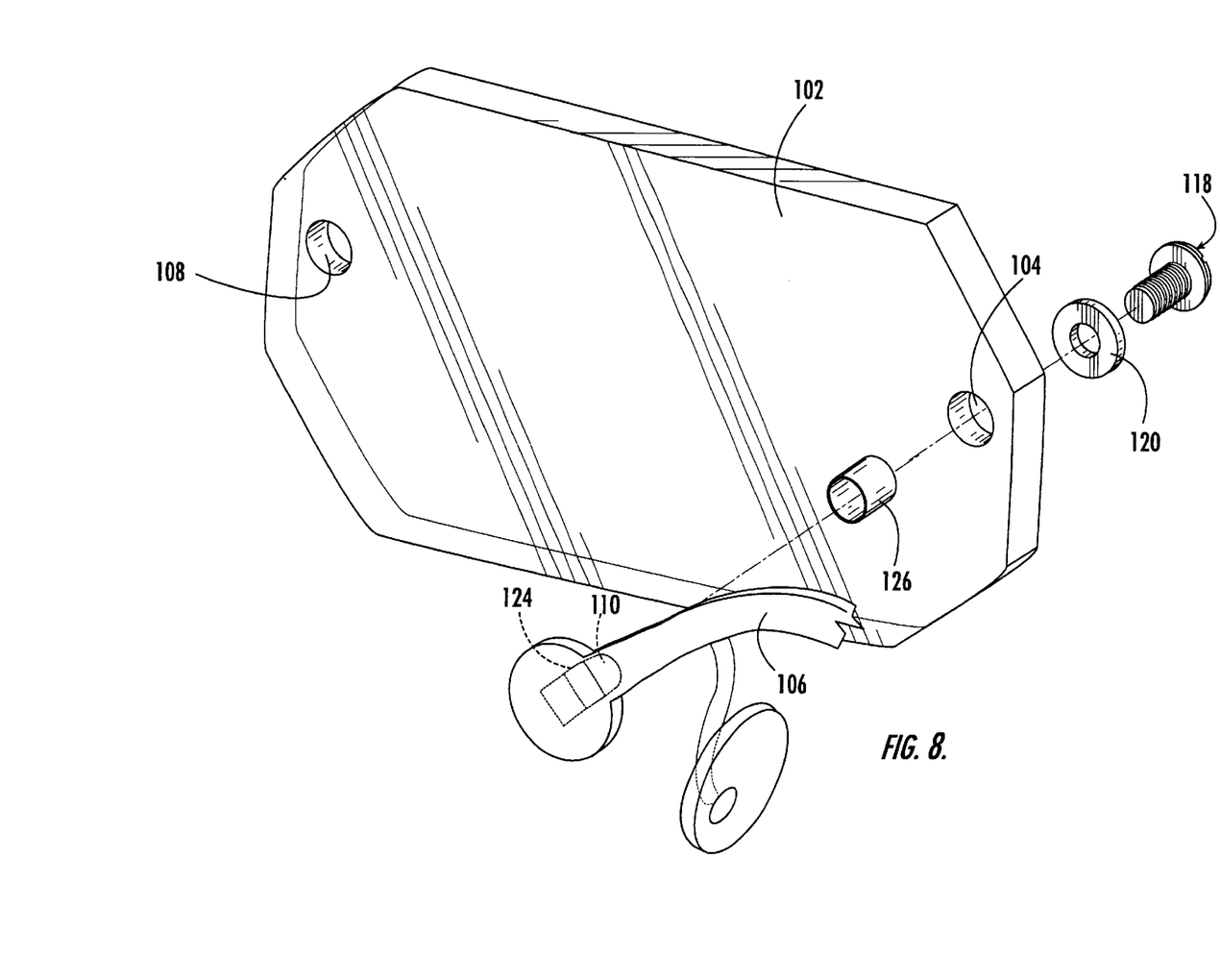
FIG. 8 is an exploded perspective view of an alternative embodiment of the connection mounting for glass rimless eyewear lenses in accordance with the present invention.

The preferred embodiment of FIGS. 2–7, the lens 102 is preferably made of polycarbonate material which is a popular material selection for eyewear lenses due to its light weight, low cost, scratch resistance and ease of handling. However, it may be desirable to use lenses that are made of glass instead of the above-mentioned materials. FIG. 8 illustrates an alternative embodiment of the present invention that can accommodate glass lenses. The construction of the connection mounting is identical to that shown in FIGS. 2–5 but also provides a protective tube 126 of cushioning material, such as rubber or elastomeric material. The tube 126 of cushioning material is placed over the bushing 110 to provide a cushioning layer between the cutting edges 124 of the bushing 110 and the interior wall of the receiving aperture 104 in the glass lens. When the bushing 110 is drawn into the receiving aperture 104 of the glass lens 102, the cutting edges 124 of the bushing 110 embed into the aperture 104 of the glass lens 102 with the cushioning tube 126 therebetween. The additional cushioning material prevents the cutting edges 124 from cracking the glass lens 102 while still being able to embed sufficiently to prevent rotation of the bushing 110 and eyewear hardware 106 integrally connected thereto.

Figure 9:
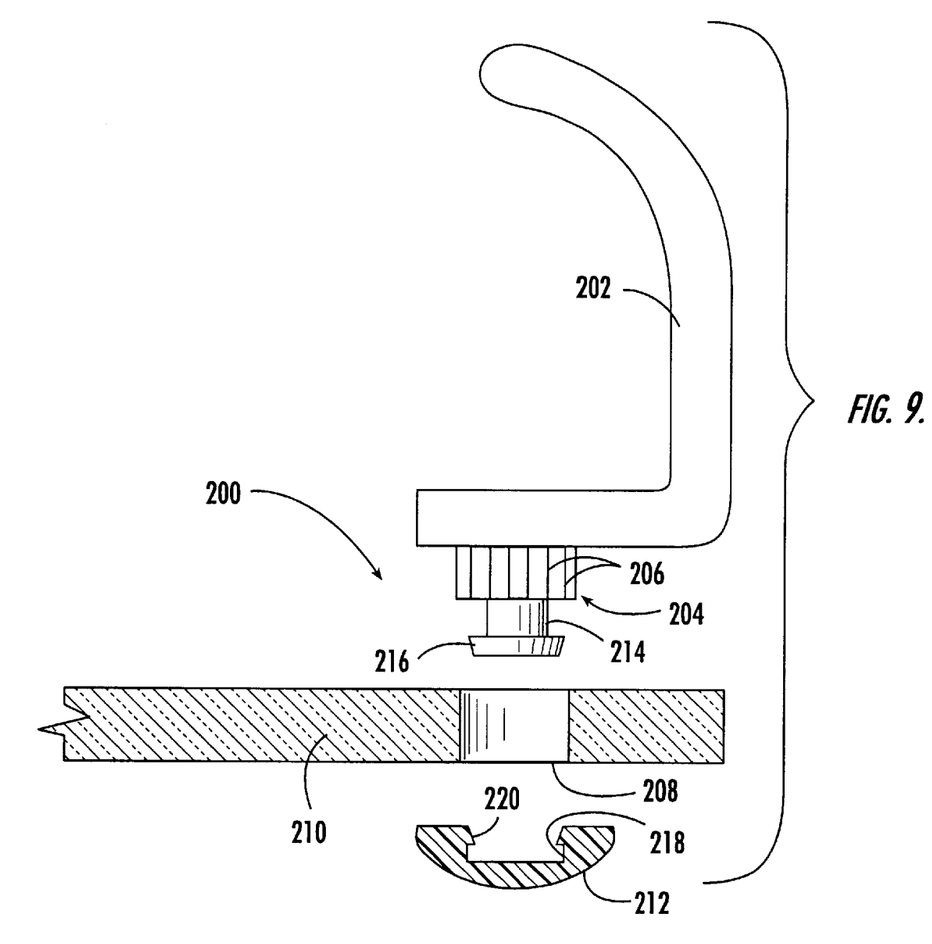
FIG. 9 is a side elevational view of a further alternative embodiment of the connection for rimless eyewear lenses of the present invention.

Turning now to FIG. 9, a further alternative embodiment 200 of the connection mounting for rimless eyewear is shown to include mounting hardware 202, shown as a clip-on prong by way of example, with a bushing 204 that includes the cutting edges 206 in similar fashion to cutting edges 124 of the preferred embodiment of FIGS. 2–7. The cutting members 206 engages with the side wall of the aperture 208 formed through the lens 210. In this further alternative embodiment, the bushing 204 is press-fit through the aperture 208 and then locked into place by communication with a snap-on fastener cap 212 to a reduced neck post 214. The head 216 of the post 214 engages with a seat 218 in the cap 212 where beveled edges 220 assist in the installation of the head 216 into the seat 218. As a result, this further alternative embodiment provides a connection mounting for rimless eyewear lenses.

The bushing 110 is preferably made of metal material, such as titanium or other common eyewear component material. The bushing 110 is preferably integrally formed with the connection component 106 itself, such as a bridge or temple. The bushing 110 may be soldered onto the connection component 106 to form a unitary member or actually formed integrally with the connection component 106. The bushing 110 and connection component 106 may also be made of a plastic or plastic composite material which may be formed by injection molding, for example. In this case, the bushing 110 and its cutting edges 124 may be simply formed integrally with the connection component 106 in the same mold. Also, the mounting system of the present invention may be installed with the bushing routed from the front of the lens toward the back of lens with the fastener (e.g. threaded screw or snap-on cap) on the rear side. It is also possible with the scope of the present invention for the bushing to be routed from the back of the lens toward the front with the faster on the front of the lens. Either attachment may be employed according the desired hardware and design aesthetics.

It will be appreciated by those skilled in the art that various changes and modifications can be made to the illustrated embodiments without departing from the spirit of the present invention. All such modifications and changes are intended to be covered by the appended claims.

What is claimed is:

1. A connection mounting for rimless eyewear for connecting hardware to a corresponding lens having a circular hardware receiving aperture with an inner wall, comprising:
   a connection member having a free end;
   a bushing connected to and emanating from the connection member proximal to the free end thereof;
   a plurality of cutting edges integrally connected to and emanating from the outer surface of the bushing; said bushing residing in the circular hardware receiving aperture with the cutting edges being embedded within the inner wall of the circular hardware receiving aperture with the cutting edges extending outwardly beyond the inner wall of the circular hardware receiving aperture.

2. The connection member of claim 1, further comprising:
   fastener means connected to said bushing for preventing removal of said bushing from said circular hardware receiving aperture.

3. The connection member of claim 2, wherein the fastener means is a female threaded aperture in the bushing and a male threaded fastener.

4. The connection member of claim 2, wherein the fastener means is a post connected to the bushing with a head snappingly engageable with a seat of a cap.

5. The connection mounting of claim 1, wherein the connection member is a eyewear bridge.

6. The connection mounting of claim 1, wherein the connection member is an eyewear temple.

7. The connection mounting of claim 1, wherein the connection member is a clip-on prong.

8. The connection mounting of claim 1, wherein the outer surface of the bushing has a substantially square cross-section and includes four cutting edges.

9. The connection mounting of claim 1, wherein the outer surface of the bushing has a star cross-section and includes sixteen cutting edges.

10. The connection mounting of claim 1, wherein the bushing is inwardly tapered extending from the connection member to the free end of the bushing.

11. The connection mounting of claim 1, wherein the lens is made of polycarbonate material.

12. A method of connecting a joint section of an eyewear frame to a corresponding lens, comprising the steps of:

providing a lens with a circular hardware receiving aperture with an inner wall;

providing a connection member having a free end;

connecting a bushing, having a free end, to the connection member;

providing a plurality of cutting edges integrally connected to and emanating from an outer surface of the bushing;

routing the bushing into the circular hardware receiving aperture;

embedding the plurality of cutting edges of the bushing into the inner wall of the lens with the cutting edges extending outwardly beyond the inner wall of the circular hardware receiving aperture thereby preventing rotation of the bushing and integrally connected connection member therein.

13. The method of claim 12, further comprising the steps of:

fastening the bushing to the lens for preventing removal of the bushing from the circular hardware receiving aperture.

14. The method of claim 12, wherein the connection member is a eyewear bridge.

15. The method of claim 12, wherein the connection member is an eyewear temple.

16. The method of claim 12, wherein the connection member is a clip-on prong.

17. The method of claim 12, further comprising the step of:

providing a bushing with a substantially square cross-section with four cutting edges.

18. The method of claim 12, further comprising the step of:

providing a bushing with a star cross-section with sixteen cutting edges.

19. The method of claim 12, further comprising the step of:

inwardly tapering the bushing from the connection member to the free end of the bushing.

20. A connection mounting for rimless eyewear for connecting a joint section to a corresponding lens having a circular hardware receiving aperture with an inner wall, comprising:

a connection member having a free end;

a bushing integrally connected to and emanating from the connection member proximal to the free end thereof; the bushing including an inner threaded bore and an outer surface and a free end;

a plurality of cutting edges integrally connected to and emanating from the outer surface of the bushing;

a threaded fastener, having a threaded shank and a head, routed through the circular hardware receiving aperture with the threaded shank in threaded communication with the inner threaded bore of the bushing with the plurality of cutting edges connected to the outer surface of the bushing being embedded in the inner wall of the circular hardware receiving aperture of the corresponding lens with the cutting edges extending outwardly beyond the inner wall of the circular hardware receiving aperture.

21. The connection mounting of claim 20, wherein the connection member is a eyewear bridge.

22. The connection mounting of claim 20, wherein the connection member is an eyewear temple.

23. The connection mounting of claim 20, further comprising:

a washer disposed between the head of the threaded fastener and the corresponding lens.

24. The connection mounting of claim 20, wherein the outer surface of the bushing has a substantially square cross-section and includes four cutting edges.

25. The connection mounting of claim 20, wherein the outer surface of the bushing has a star cross-section and includes sixteen cutting edges.

26. The connection mounting of claim 20, wherein the bushing is inwardly tapered extending from the connection member to the free end of the bushing.

27. The connection mounting of claim 20, wherein the lens is made of polycarbonate material.

28. A method of connecting a joint section of an eyewear frame to a corresponding lens, comprising the steps of:

providing a lens with a circular hardware receiving aperture with an inner wall;

providing a connection member having a free end;

integrally connecting a bushing, having a free end, to the connection member;

providing a threaded bore in the bushing;

providing a plurality of cutting edges integrally connected to and emanating from an outer surface of the bushing;

threadably routing a threaded shank of a fastener with a head into the threaded bore of the bushing;

drawing the bushing into the circular hardware receiving aperture by further threaded routing of the threaded shank into the threaded bore; and embedding the plurality of cutting edges of the bushing into the inner wall of the lens thereby preventing rotation of the bushing and integrally connected connection member therein with the cutting edges extending outwardly beyond the inner wall of the circular hardware receiving aperture.

29. The method of claim 28, wherein the connection member is a eyewear bridge.

30. The method of claim 28, wherein the connection member is an eyewear temple.

31. The method of claim 28, further comprising the step of:

providing a washer between the head of the threaded fastener and the lens.

32. The method of claim 28, further comprising the step of:

providing a bushing with a substantially square cross-section with four cutting edges.

33. The method of claim 28, further comprising the step of:

providing a bushing with a star cross-section with sixteen cutting edges.

34. The method of claim 28, further comprising the step of: inwardly tapering the bushing from the connection member to the free end of the bushing.

35. A connection mounting for rimless eyewear for connecting hardware to a corresponding lens having a hardware receiving aperture with an inner wall, comprising:

a connection member having a free end;

a bushing connected to and emanating from the connection member proximal to the free end thereof;

a plurality of cutting edges integrally connected to and emanating from the outer surface of the bushing; said bushing residing in the hardware receiving aperture with the cutting edges being embedded within the inner wall of the hardware receiving aperture; and fastener means connected to said bushing for preventing removal of said bushing from said hardware receiving aperture; the fastener means being a post connected to the bushing with a head snappingly engageable with a seat of a cap.

36. The connection mounting of claim 35, wherein the connection member is a eyewear bridge.

37. The connection mounting of claim 35, wherein the connection member is an eyewear temple.

38. The connection mounting of claim 35, wherein the connection member is a clip-on prong.

39. The connection mounting of claim 35, wherein the connection member is a top bar with a clip-on prong.

40. The connection mounting of claim 35, wherein the outer surface of the bushing has a substantially square cross-section and includes four cutting edges.

41. The connection mounting of claim 35, wherein the outer surface of the bushing has a star cross-section and includes sixteen cutting edges.

42. The connection mounting of claim 41, wherein the resilient material is rubber.

43. The connection mounting of claim 35, further comprising:

a tube of resilient material disposed about the bushing and in communication with the plurality of cutting edges.

44. The connection mounting of claim 35, wherein the bushing is inwardly tapered extending from the connection member to the free end of the bushing.

45. The connection mounting of claim 35, wherein the lens is made of polycarbonate material.

* * * * *